J. Haworth,
Railroad,
N°. 34,957. Patented Apr. 15, 1862.
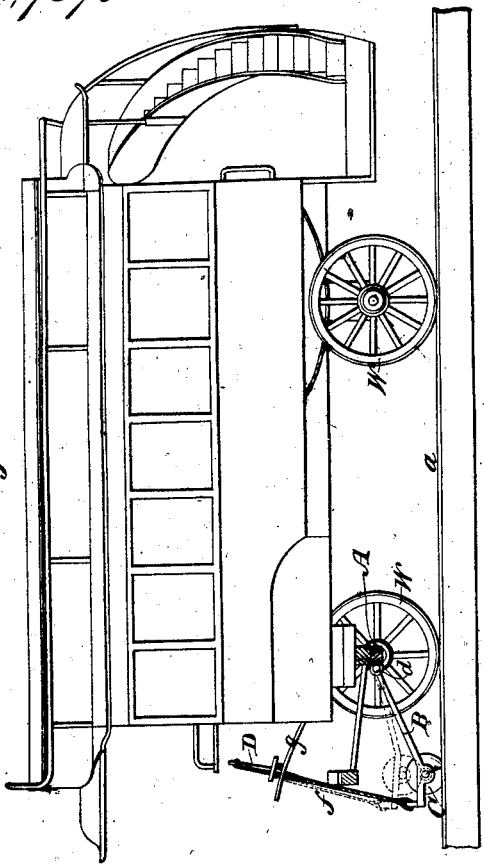
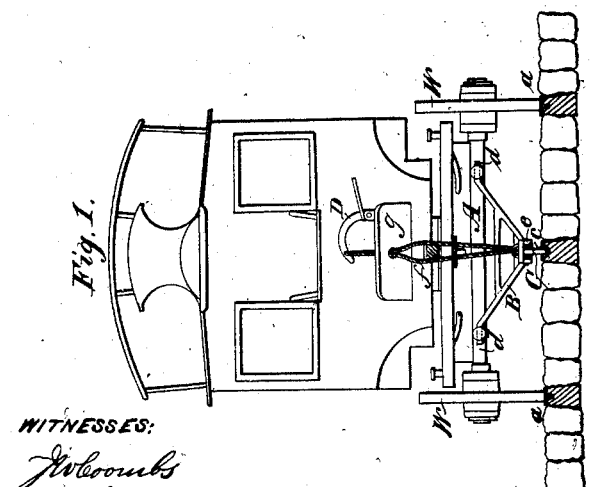
WITNESSES:
INVENTOR:

UNITED STATES PATENT OFFICE.

JOHN HAWORTH, OF MANCHESTER, GREAT BRITAIN.

STREET-RAILWAY.

Specification of Letters Patent No. 34,957, dated April 15, 1862.

*To all whom it may concern:*

Be it known that I, JOHN HAWORTH, of the city of Manchester, in the county of Lancaster, in the United Kingdom of Great Britain and Ireland, have invented certain Improvements in Tramways for Streets and Ordinary Roads; and I do hereby declare that the following is a full, clear, and exact description of the same, reference being had to the accompanying drawings, forming part of this specification, in which—

Figure 1, exhibits a transverse section of a tramway and front view of an omnibus. Fig. 2, is a side view of the same with part of the running gear of the omnibus in section. Fig. 3, exhibits a plan of the tramway and of what I call the perambulator of the carriage.

Similar letters of reference indicate corresponding parts in the several figures.

To enable others to fully understand my invention I will proceed to describe it with reference to the accompanying drawings.

The tramway is shown in Figs. 1 and 3. $a, a$, are the outer rails on which the ordinary wheels W, W, of the omnibus or other carriage run; these rails are made of rolled T shaped iron, the center web of the rail being let into and the top web bearing upon and screwed to longitudinal wood sleepers. $c$, is the intermediate rail which is grooved longitudinally, and is let into and bears upon a central longitudinal wood sleeper to which it is screwed. The wood sleepers should be of dovetail form or wider at the bottom than at the top so that when suitably shaped paving stones are set on them they are securely held and incapable of rising. The rails $a, a$, and $c$, are on the same level as the other portion of the street or road to which they are applied, consequently they offer no obstruction to carriages or horses passing across them, and they may be set to the transverse curve of the road or street.

A, is the front axle of the omnibus or other carriage. This axle may be constructed and applied in the usual manner.

B is a frame hinged at $d, d$, to the front of the axle A for the purpose of holding the axle $e$, of the guide wheel C, whose circumference runs in the groove of the rail $c$. The front of this frame is attached by a chain cord or strap F, to a treadle D, arranged on the driver's foot board $g$, in such manner that by pressing on the said treadle with his foot, the driver may raise the said frame as shown by dotted outline in Fig. 2 high enough to lift the guide wheel out of the groove in the rail $c$. A catch may be applied to lock the treadle when the guide wheel is raised, and so relieve the driver of the labor of holding it up by the pressure of his foot; and a spring may be applied to the frame B for the purpose of pressing it down and confining the wheel C in the groove of the rail $c$.

The operation of the invention is as follows. Suppose the carriage to be running directly along a straight or nearly straight street or road, the treadle is released and the guide wheel, running in the groove of the rail $c$, keeps the wheels W, W, on the rails $a, a$, as shown in Fig. 1. As soon, however, as it is requisite to turn short around a corner, or is otherwise desirable to move the carriage off the tramways, the driver presses down the treadle D and so raises the frame B, and wheel C, as shown in dotted outline in Fig. 2, in which position of the said wheel, it will be apparent that the carriage can be moved in any direction off the tramways and again brought on them without hindrance, as the rails and the road are on the same level. When the driver has brought the carriage on or in a line with the tramways, he lowers the frame B to bring the wheel C, into the groove of the rail $c$.

The connection between the guide wheel C, with the treadle or other device through which the driver controls the said wheel may be considerably modified, as for instance, the frame B, may have applied to it a spring or counterbalance which raises it when the driver's foot is removed from the treadle, and in that case the said frame will be depressed and held down by the pressure of the driver's foot upon the treadle.

I am aware that a grooved guide wheel and central rail or rib which rises above the ground has been used in connection with side rails, also elevated above the ground like the ordinary T-rails. These devices I do not claim; but

What I claim as my invention and desire to secure by Letters Patent of the United States of America is—

The employment, in combination with each other, of the flat grooved central rail $c$, the adjustable guide wheel C, running within said rail and the flat rails $a$, $a$, as herein shown and described.

JOHN HAWORTH.

Witnesses:
H. B. BARLOW,
J. PERKINS.